(12) United States Patent
Weissenmayer (10) Patent No.: US 11,115,236 B2
(45) Date of Patent: Sep. 7, 2021

(54) SUBSCRIBER STATION FOR A BUS SYSTEM AND METHOD FOR TRANSMITTING DATA IN A BUS SYSTEM

(71) Applicant: Robert Bosch GmbH, Stuttgart (DE)

(72) Inventor: Simon Weissenmayer, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/742,995

(22) Filed: Mar. 20, 2020

(65) Prior Publication Data
US 2020/0244479 A1 Jul. 30, 2020

(30) Foreign Application Priority Data
Jan. 24, 2019 (DE) .................... 10 2019 200 907.7

(51) Int. Cl.
*H04L 12/403* (2006.01)
*H04L 12/413* (2006.01)
*H04L 12/40* (2006.01)
*H04L 25/02* (2006.01)
*B60R 16/023* (2006.01)
*G06F 13/40* (2006.01)
(Continued)

(52) U.S. Cl.
CPC .......... *H04L 12/403* (2013.01); *B60R 16/023* (2013.01); *G06F 13/376* (2013.01); *G06F 13/4063* (2013.01); *G06F 13/4282* (2013.01); *H04L 12/4013* (2013.01); *H04L 12/40032* (2013.01); *H04L 12/4135* (2013.01); *H04L 25/0272* (2013.01); *H04L 67/12* (2013.01); *H04L 2012/40215* (2013.01); *H04L 2012/40273* (2013.01)

(58) Field of Classification Search
CPC .................................................. G06F 13/4282
See application file for complete search history.

(56) References Cited

U.S. PATENT DOCUMENTS 7,472,106 B2 * 12/2008 Muneta .................. G05B 19/05
7,701,943 B2 * 4/2010 Harris ................ B60H 1/00642
370/392

* cited by examiner

*Primary Examiner* — Henry Tsai
*Assistant Examiner* — Juanito Borromeo
(74) *Attorney, Agent, or Firm* — Norton Rose Fulbright US LLP; Elizabeth Tretter (57) ABSTRACT

Subscriber-stations for a bus-system, and data-transmission method in a bus-system. The subscriber-stations include master-subscriber-station(s) and at least two slave-subscriber-stations for the bus-system. The master-subscriber-station includes a first-transceiver-device for sending/receiving a message to/from at least one slave-subscriber-station that is subordinate control-wise to the master-subscriber-station, via a first-sub-bus of the bus-system, a second-transceiver-device for sending/receiving a message to/from at least one other subscriber-station, via a second-sub-bus of the bus-system, a communication-control-device for creating the message to be sent or for evaluating a message received from one of the sub-buses of the bus-system, and a linking-device for linking a terminal of the first-transceiver-device that is for outputting of a signal generated from the message received from the first-sub-bus and a terminal of the second-transceiver-device for outputting a signal generated from the message received from the second-sub-bus, so that only one signal is forwarded, as a receive-signal, to a communication-control-device terminal.

15 Claims, 5 Drawing Sheets

(51) Int. Cl.
*G06F 13/376* (2006.01)
*G06F 13/42* (2006.01)
*H04L 29/08* (2006.01)

SUBSCRIBER STATION FOR A BUS SYSTEM AND METHOD FOR TRANSMITTING DATA IN A BUS SYSTEM

RELATED APPLICATION INFORMATION

The present application claims priority to and the benefit of German patent application no. 10 2019 200 907.7, which was filed in Germany on Jan. 24, 2019, the disclosure which is incorporated herein by reference.

FIELD OF THE INVENTION

The present invention relates to a subscriber station for a bus system and to a method for data transmission in a bus system, in which the data transmission rate between sensors and a control device is increased in comparison with conventional CAN bus systems.

BACKGROUND INFORMATION

For communication between sensors and control devices, for example in vehicles, more and more frequently a bus system is used in which data are transmitted as messages in the standard ISO 11898-1:2015 as a CAN protocol specification, with CAN FD. The messages are transmitted between the subscriber stations of the bus system, such as sensor, control device, output device, etc. Here, CAN FD is currently, in the introduction phase in the first step, usually used with a data bit rate of 2 Mbps in the transmission of bits of the data field, and with an arbitration bit rate of 500 kbps in the transmission of bits of the arbitration field in the vehicle.

A further increase of the data rate is achievable in many cases only through a reduction of the subscribers at the bus, so that the existing buses are divided more and more often. As a result, the number of CAN buses constantly increases. However, this causes problems if information has to reach a very large number of subscriber stations of the bus system without large delays. For this reason, powerful microcontrollers or control devices of the vehicle are equipped with a very large number of CAN protocol controllers, so that the microcontrollers or control devices can simultaneously take part in the communication with a very large number of bus systems. However, this causes the costs of the bus system to increase, because CAN protocol controllers are comparatively expensive.

SUMMARY OF THE INVENTION

It is therefore an object of the present invention to provide a subscriber station for a bus system and a method for data transmission in a bus system that solve the problems named above. In particular, a subscriber station for a bus system and a method for data transmission in a bus system are to be provided in which sensors having high data rates can be connected, even in a retrofit manner, at low cost to an existing serial bus system, in particular a CAN bus system, in such a way that the data of the sensors can be transmitted to other subscriber stations of the bus system with a high data transmission rate.

The object is achieved by a master subscriber station for a bus system having the features described herein. The master subscriber station includes a first transceiver device for transmitting a message to, and/or receiving a message from, at least one slave subscriber station that is subordinate to the master subscriber station in terms of control, via a first sub-bus of the bus system, a second transceiver device for sending a message to and/or receiving a message from at least one other subscriber station via a second sub-bus of the bus system, a communication control device for creating the message to be sent or for evaluating a message received from one of the sub-buses of the bus system, and a linking device for linking a terminal of the first transceiver device, provided to output a signal that was generated from the message received from the first sub-bus, and a terminal of the second transceiver device, provided to output a signal that was generated from the message received from the second sub-bus, so that only one signal is forwarded, as receive signal, to a terminal of the communication control device.

With the described subscriber station, additional sensors can retroactively be added to an already-existing and proven bus, without a large outlay. As a result, there is less outlay for modification and testing than was previously the case.

On the basis of the configuration of the described subscriber station, the microcontrollers of the control devices can be equipped with fewer bus protocol controllers or communication control devices.

In particular, even if two or more sensors are connected to a microcontroller of a control device, only one bus protocol controller, or only one communication control device, is required. In this way, costs for the bus system can be saved.

Advantageous further embodiments of the subscriber station are indicated in the further descriptions herein.

According to the exemplary embodiments, the linking device is configured and connected to the communication control device in such a way that in a case in which both the signal at the terminal of the first transceiver device is present and the signal at the terminal of the second transceiver device is present, at the terminal of the communication control device a receive signal is forwarded having signal states that result from a superposition of the signal states of the signal at the terminal of the first transceiver device with the signal states of the signal at the terminal of the second transceiver device.

According to the exemplary embodiments, the first transceiver device is configured to actively retrieve data from at least one slave subscriber station of the first sub-bus.

Possibly, the communication control device is configured to select an identification number in the message sent by the master subscriber station as a function of which data are to be retrieved from which subscriber station of the sub-bus.

Possibly, the communication control device and the first and second transceiver device are connected in such a way that a message to be sent that was created by the communication control device is inputted into the first and second transceiver device in order to send the message on the first and second sub-bus.

It is conceivable that the at least one other subscriber station of the second sub-bus of the master subscriber station is subordinate in terms of control, or is superordinate in terms of control, or is coordinate in terms of control.

Optionally, the master subscriber station is a control device and the at least one slave subscriber station of the first sub-bus is a sensor or an actuator, the at least one other subscriber station of the second sub-bus being a control device or a sensor or an actuator.

Moreover, the first transceiver device can be configured, if the master subscriber station has an exclusive, collision-free access to the first sub-bus, to send a bus signal having a voltage level that can be overridden by the slave subscriber station, the first transceiver device being configured to lower its decision threshold for receiving data to a second decision threshold if the master subscriber station has the exclusive, collision-free access to the first sub-bus, so that the first transceiver device can receive data that the slave subscriber station produces with a lower maximum voltage level than the maximum voltage level with which the master subscriber station sends the message, the first transceiver device being configured, after the elapsing of a prespecified time duration during which the master subscriber station has the exclusive, collision-free access to the first sub-bus, to raise its decision threshold for receiving data to a decision threshold and to send an acknowledge bit on the sub-bus that has the larger maximum voltage level.

The subscriber station described above can be part of a bus system that in addition includes at least two sub-buses and at least one slave subscriber station that is subordinate in terms of control to the master subscriber station, the at least one master subscriber station and the at least one slave subscriber station being connected to one another via one of the at least two sub-buses in such a way that the at least one master subscriber station can communicate with at least one of the slave subscriber stations.

Here, subscriber stations of the bus system can be configured to communicate via at least one sub-bus using a communication protocol, in which, in a first communication phase, it is negotiated which of the subscriber stations has, in a second communication phase, a collision-free access to the sub-bus, the at least one slave subscriber station being configured to send data to the at least one master subscriber station via the sub-bus in a second communication phase in which the at least one master subscriber station has the collision-free access to the sub-bus and sends a voltage level, capable of being overwritten for the at least one slave subscriber station, on the bus.

Here, the at least one slave subscriber station can have a transceiver device for sending data for a message to, and/or receiving a message from, a master subscriber station that is superordinate to the slave subscriber station in terms of control, via a first sub-bus of the bus system, the transceiver device being configured to insert the data into a message sent by the master subscriber station of the bus system if the master subscriber station actively requests the slave subscriber station to insert the data.

The transceiver device of the slave subscriber station can in addition be configured to produce the data with a lower maximum voltage level than the maximum voltage level with which the master subscriber station sends the message, the transceiver device in addition being configured to prefix at least one start bit to the data, and, following the data, to send a bus signal having the lower of the two voltage levels sent by the transceiver device.

In an embodiment, the transceiver device of the slave subscriber station is configured to send the data on the sub-bus with a higher data rate than the data rate of the message sent by the master subscriber station of the bus system.

Possibly, the transceiver device of the slave subscriber station is configured to evaluate an identification number in the message sent by the master subscriber station, the transceiver device in addition being configured to select the data that are to be inserted into the message sent by the master subscriber station of the bus system on the basis of the result of the evaluation of the identification number.

According to an exemplary embodiment, the transceiver device of the slave subscriber station is configured to insert the data between stuff bits that are sent by the master subscriber station at regular intervals when the master subscriber station has an exclusive, collision-free access to the sub-bus.

The object named above is in addition achieved by a method for data transmission and a bus system as described herein. In the bus system, at least one master subscriber station is connected to at least two sub-buses to each of which at least one subscriber station is connected, the at least one master subscriber station having a communication control device for creating the message to be sent or for evaluating a message received from one of the sub-buses, and the at least one master subscriber station in addition having at least one first transceiver device for a first sub-bus and a second transceiver device for a second sub-bus, and the method having the steps: using the first transceiver device to send a message to and to receive a message from at least one slave subscriber station that is subordinate in terms of control to the master subscriber station via the first sub-bus; using the second transceiver device to send a message to and receive a message from at least one other subscriber station via the second sub-bus; using a linking device connected to the communication control device to link a terminal of the first transceiver device, at which a signal is outputted that was generated from the message received from the first sub-bus, and a terminal of the second transceiver device at which a signal is outputted that was generated from the message received from the second sub-bus, so that only one signal, as receive signal, is forwarded to a terminal of the communication control device.

The method offers the same advantages named above in relation to the subscriber station.

Further possible implementations of the present invention also include combinations not explicitly named of features or specific embodiments described above or in the following in relation to the exemplary embodiments. The person skilled in the art will also add individual aspects, as improvements or supplementation, to the respective basic form of the present invention.

In the following, the present invention is described in more detail with reference to the accompanying drawing and on the basis of exemplary embodiments.

In the Figures, identical or functionally identical elements are provided with the same reference characters, unless otherwise indicated.

DETAILED DESCRIPTION

Figure 1:
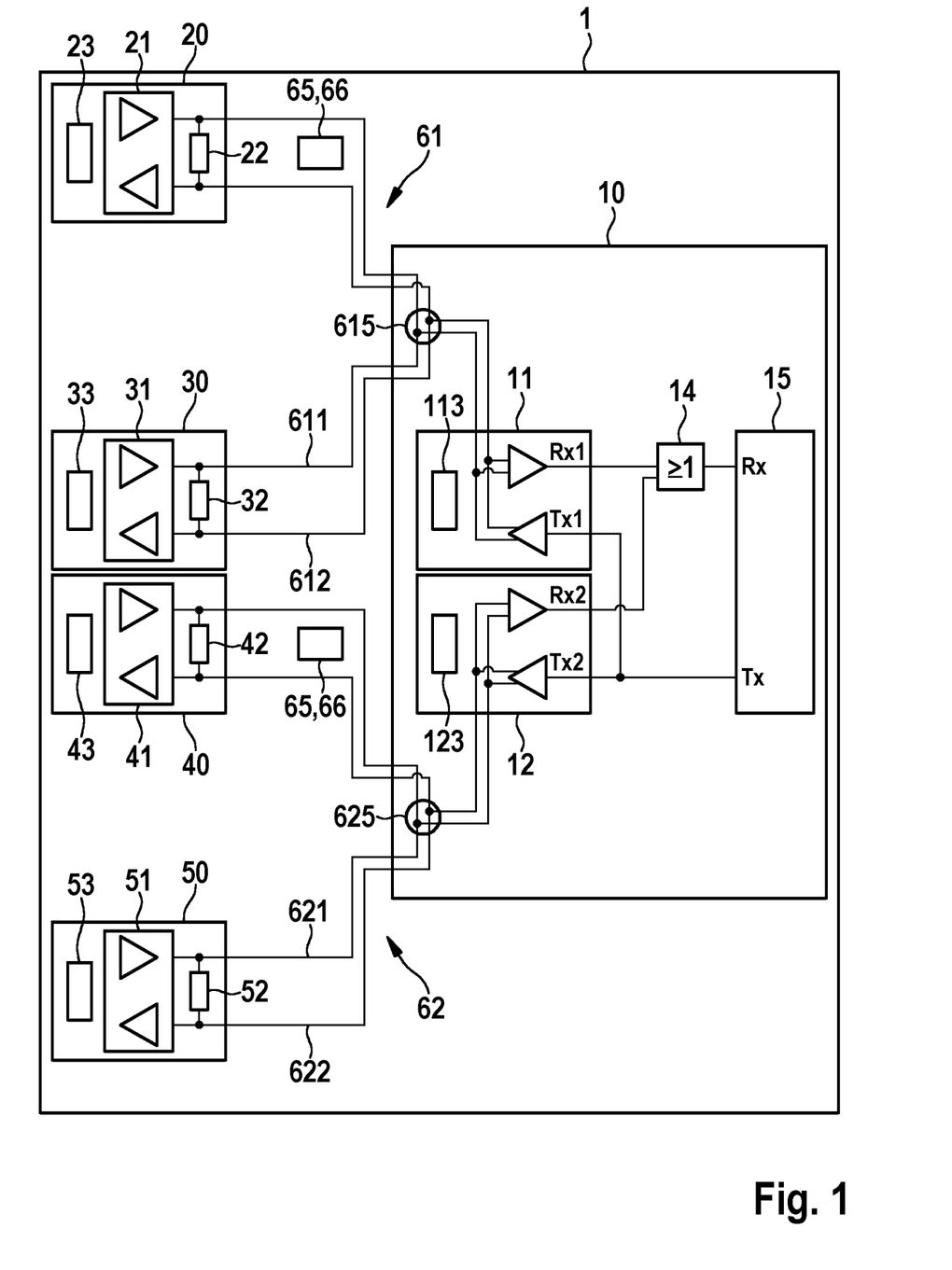
FIG. 1 shows a simplified schematic diagram of a bus system according to a first exemplary embodiment.

FIG. 1 shows a specific example of a bus system 1 that can be for example a serial bus system, in particular a CAN bus system, in which communication takes place according to the CAN and/or CAN FD protocol, etc. Bus system 1 may be used in a vehicle, in particular a motor vehicle, an aircraft, etc., or in some other technical apparatus, in particular in an assembly and/or disassembly plant, a hospital, etc. However, bus system 1 is not limited to a CAN bus system.

In FIG. 1, bus system 1 has, as an example, a first through fifth subscriber station 10, 20, 30, 40, 50, connected to a first and second sub-bus 61, 62. Of course, alternatively more or fewer subscriber stations may be connectable to bus system 1.

First subscriber station 10 has a first transceiver device 11, a second transceiver device 12, a linking device 14, and a communication control device 15.

In contrast, second subscriber station 20 has a transceiver device 21 and reflection reduction unit 22. Third subscriber station 30 has a transceiver device 31 and reflection reduction unit 32. Transceiver devices 11, 21, 31 of subscriber stations 10, 20, 30 are each connected directly to bus 61, although this is not shown in more detail in FIG. 1. Transceiver devices 12, 41, 51 of subscriber stations 10, 40, 50 are each connected directly to bus 62, although this is not shown in more detail in FIG. 1.

More precisely, subscriber stations 10, 20, 30 are each connected to a first bus lead 611 and a second bus lead 612 of sub-bus 61. Bus leads 611, 612 can also be referred to as leads for CAN_H and CAN_L, and are used to couple in the dominant level for signals CAN_H and CAN_L in the transmit state. In subscriber station 20, reflection reduction unit 22 is connected between the two bus leads 611, 612 of sub-bus 61.

Subscriber stations 10, 40, 50 are each connected to a first bus lead 621 and to a second bus lead 622 of second sub-bus 62. Bus leads 611, 612 can also be referred to as leads for CAN_H and CAN_L, and are used to couple in the dominant level for signals CAN_H and CAN_L in the transmit state. In subscriber station 40, reflection reduction unit 22 is connected between the two bus leads 621, 622 of sub-bus 62. In subscriber station 50, reflection reduction unit 52 is connected between the two bus leads 621, 622 of sub-bus 62.

Via the first sub-bus 61, messages 65, 66 can be transmitted as frames in the form of signals CAN_H and CAN_L between the individual subscriber stations 10, 20, 30. Here, between the signals CAN_H and CAN_L, a difference voltage Up forms as bus signal. This is described in more detail below, in particular with reference to FIG. 3. Messages 65 can be sent in CAN or CAN FD frames. Messages 66 are sent in frames according to a successor system of CAN FD.

Via second sub-bus 62, messages 65, 66 can be transmitted as frames in the form of signals CAN_H and CAN_L between the individual subscriber stations 10, 40, 50. Here, difference voltage Up is also formed as bus signal between the signals CAN_H and CAN_L.

Communication device 15 is used to control a communication of subscriber station 10 via buses 61, 62 with at least one of the subscriber stations 20, 30, 40, 50. Communication control device 11 can be realized as a conventional CAN controller or CAN FD controller. In addition, communication control device 11 can be realized according to a successor system of CAN FD in order to send messages 66. Transceiver devices 11, 12, 21, 31, 41, 51 are then correspondingly realized.

First subscriber station 10 in FIG. 1 is for example a control device of a motor vehicle. Second subscriber station 20 and third subscriber station 30 are each for example a sensor of the motor vehicle. In addition, fourth subscriber station 40 and fifth subscriber station 50 can each be for example a sensor of the motor vehicle. The sensor can be any sensor that is suitable, in particular, for a radar measurement, for use in a camera, for a lidar measurement, or for measuring ultrasound, etc. In particular, the sensor is used in connection with autonomous driving, in which the sensor requires a large portion of the bandwidth of the data transmission. However, alternatively the sensor can also be suitable for measuring at least one other physical variable, such as temperature, pressure, humidity or raindrops, etc.

In the previously named example, first subscriber station 10 is superordinate to second and third subscriber station 20, 30 in terms of control. First subscriber station 10 can therefore be designated master subscriber station. Second subscriber station 20 can be designated slave subscriber station. Third subscriber station 30 can be designated slave subscriber station. Moreover, first subscriber station 10 is superordinate in terms of control to fourth and fifth subscriber station 40, 50. Therefore, fourth subscriber station 40 can be designated slave subscriber station. Fifth subscriber station 50 can also be designated slave subscriber station.

Thus, the bus of bus system 1 is divided into a plurality of sub-buses 61, 62. In the example of FIG. 1, two sensors (subscriber stations 20, 30 or 40, 50) are always connected, together with the control device (subscriber station 10), to one of the sub-buses 61, 62. The conductors of the sensors (subscriber stations 20, 30) are led into the control device (subscriber station 10), and are connected to one another at transceiver device 11. The conductors of the sensors (subscriber stations 40, 50) are led into the control device (subscriber station 10) and are connected to one another at transceiver device 12.

Thus, subscriber station 10 (control device) is connected to a respective transceiver device 11, 12 at each of the sub-buses 61, 62. The Rx1 and Rx2 terminals (pins) of the sub-bus transceiver devices 11, 12 are disjunctively linked, via linking device 14, and are connected to the Rx (input) terminal of communication control device 15. Linking device 14 is thus a logic module, namely an OR gate. The Tx (output) terminal of communication control device 15 is connected to all the Tx terminals (pins) of transceiver devices 11, 12.

More precisely, linking device 14 can receive a signal from sub-buses 61, 62 at each of its terminals Rx1, Rx2. However, linking device 14 always conducts only one signal, as received signal RX, to terminal Rx of communication control device 15. Here, linking device 14 forwards either the signal at terminal Rx1 or the signal at terminal Rx2. Such a case occurs whenever subscriber station 10 requests data 652 only from one of the subscriber stations 20, 30, 40, 50, and in addition no error occurs in which one of the subscriber stations wrongly reads in an identification number 651x, 653x and as a result inserts incorrect data 652 into message 65.

If, however, a signal is present both at terminal Rx1 and terminal Rx2, then linking device 14 forms a single signal from the two signals at terminal Rx1 and terminal Rx2. For this purpose, linking device 14 superposes the respective simultaneously present signal states. In this case, receive signal RX at terminal Rx of communication control device 15 is a signal having signal states that result from a superposition of the signal states of the signal at terminal Rx1 of first transceiver device 11 with the signal states of the signal at terminal Rx2 of second transceiver device 12. Such a case occurs whenever one of the subscriber stations wrongly reads in an identification number 651x, 653x and as a result inserts incorrect data 652 into message 65, or when subscriber station 10 simultaneously requests data 652 from more than one of subscriber stations 20, 30, 40, 50. Here, it is possible that at least one of subscriber stations 20, 30, 40, 50 is configured to insert data 652 into message 65 only after a specified time span, so that the data 652 of two subscriber stations 20, 30, 40, 50 are not superposed.

Transceiver devices 11, 12 and/or linking device 14 and/or the connection of the Tx terminals are ideally realized as a common component, as shown in FIG. 1. As a result, as few terminals as possible are required at subscriber station 10. In addition, fewer conductors have to be routed to communication control device 15 on the circuit board.

Alternatively, the connection of the Tx terminals and/or the linking device 14 can be realized in communication control device 15.

Such circuits, as shown in FIG. 1 and described above, can be configured for example by software. In this way, under favorable circumstances no modification is necessary at the microcontroller, or at communication control device 15 and transceiver devices 11, 12, although here no terminals (pins) can be saved.

Transceiver devices 11, 12 of subscriber station 10 are each used to send and/or receive messages 65, 66. Transceiver devices 11, 12 can be realized as a conventional CAN transceiver and/or CAN FD transceiver. In addition, transceiver device 11 of first subscriber station 10 has changeover device 113, described in more detail below. In addition, transceiver device 12 of first subscriber station 10 has changeover device 123, described in more detail below.

Transceiver devices 21, 31 are used to receive messages 65, 66, but also to send data 652, as described in more detail below. For this purpose, subscriber station 20 has changeover device 23. Subscriber station 30 has changeover device 33 for this purpose.

Transceiver devices 41, 51 are used to receive messages 65, 66, but also to send data 652, as described in more detail below. For this purpose, subscriber station 40 has changeover device 43. Subscriber station 50 has changeover device 53 for this purpose.

Data 652 are realized in particular with a lower level than 5 V or 3.3 V, which is the voltage level otherwise standard in digital systems. Messages or signals having a lower level than 5 V or 3.3 are also referred to in the following as LV messages, and their bits are also referred to as LV bits. In subscriber stations 20, 30, 40, 50, the voltage of the sent bus signal to ground has a value of approximately 1.2 V, or difference voltage $U_D$ has a value in a range $0.0\ V \leq U_D \leq 0.5\ V$. In contrast, subscriber station 10 sends a bus signal whose difference voltage signal level has a value in a range $0.0\ V \leq U_D \leq 2\ V$.

Using reflection reduction units 22, 32, 42, 52, reflections can be suppressed that arise due to open bus lead ends, plug connectors, or branchings in the corresponding sub-buses 61, 62. Reflection reduction units 22, 32, 42, 52 can for example each be realized as Zener diodes that, at as many points as possible, limit difference voltage $U_D$ at the respective sub-bus 61, 62 to at least 0 V and to a maximum of 2 V. In order to also enable the suppression of reflections for LV bits, during the transmission of LV bits the voltage is limited, additionally if warranted, to a maximum of 0.5 V or even 0.2 volts. In good time before the transmission of bits at the original level, the 0.5 V limiting is canceled, so that the limiting to 2 V is in effect. However, a hard limit to 0.5 or 0.2 V would have the result that no standard bit, with 2 V, could be transmitted. For this reason, the configuration is such that when an LV transmission is to be expected, then as many as possible of subscriber stations 10, 20, 30, 40, 50 limit the voltage to a maximum of 0.5 or 0.2 V, but also only as long as the short-circuit current caused by the limiting, namely the current through the Zener diode, does not exceed a specified value. If the short-circuit current is for example greater than 0.3 mA, then the limiting is switched over from 0.5 V or 0.2 V to 2 V, thus permitting transmission of a standard bit with 2 V.

Figure 2:
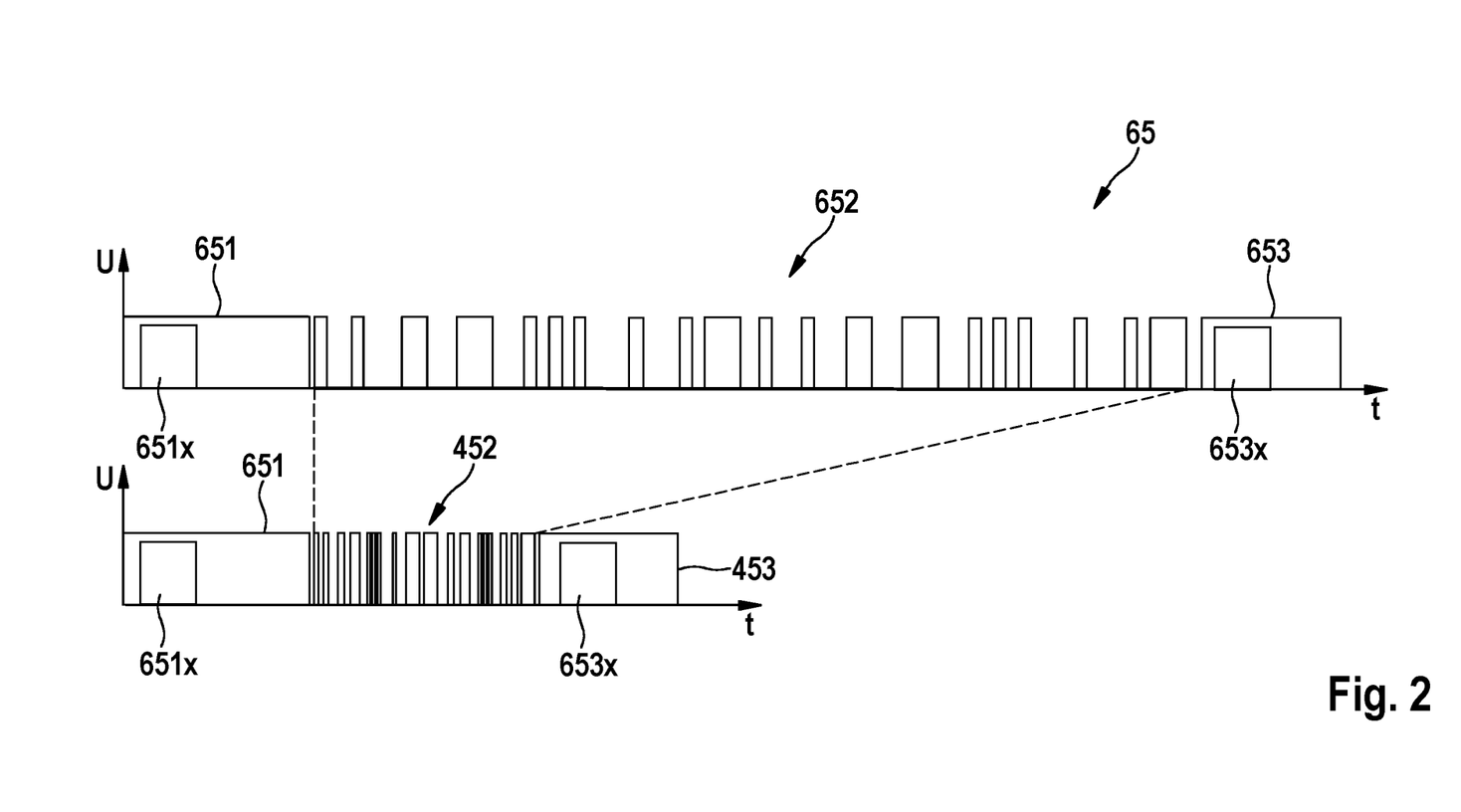
FIG. 2 shows an illustration of the structure of a message sent by at least one subscriber station of the bus system according to the first exemplary embodiment.

As is shown in FIG. 2 on the basis of message 65 for a CAN frame at top in FIG. 2 and a CAN FD frame at bottom in FIG. 2, each shown as voltage U over time t, the CAN communication at the two sub-buses 61, 62 can fundamentally be divided into two different communication phases. The first of these communication phases is one of the arbitration phases 651, 653, shown only schematically. The second communication phase is the sending of data 652 in a region that, in CAN FD, can also be called the data phase. In CAN FD, in comparison with classical CAN, at the end of the arbitration phase 651, 653 the bit rate for the following data phase is raised to e.g. 2, 4, 8 Mbps. Here, in CAN FD or a successor system of CAN FD, the bit rate in arbitration phases 651, 653 is less than the bit rate in the region for data 652. In the case of CAN FD, the region for data 652 is significantly shorter in comparison with the region for data 652 of the CAN frame, as can be seen by comparing the CAN frame at top in FIG. 2 to the CAN FD frame at bottom in FIG. 2. The same holds for a message 66 that is constructed according to a successor system of CAN FD. In a successor system of CAN FD, in the second communication phase more than 64 bytes can be transmitted in the data field, so that the frame in a successor system of CAN FD is longer than a CAN FD frame.

In the arbitration phases 651, 653, with the aid of identifiers, or identification numbers 651x, 653x, it is negotiated between subscriber stations 10, 20, 30 at sub-bus 61 which of the currently transmitting subscriber station(s) 10, 20, 30 of bus system 1 will receive, in the subsequent second communication phase, an exclusive, collision-free access to sub-bus 61 at least at times. After this first communication phase, in the second communication phase, which corresponds to the region for data 652, a transmission of the useful data of message 65 or 66 takes place. For message 65 or 66, this takes place through an interaction of subscriber stations 10, 20, or an interaction of subscriber stations 10, 30, as follows. The same holds in a similar manner for subscriber stations 10, 40, 50 at sub-bus 62.

The following description relating to sub-bus 61 also holds for sub-bus 62.

Figure 3:
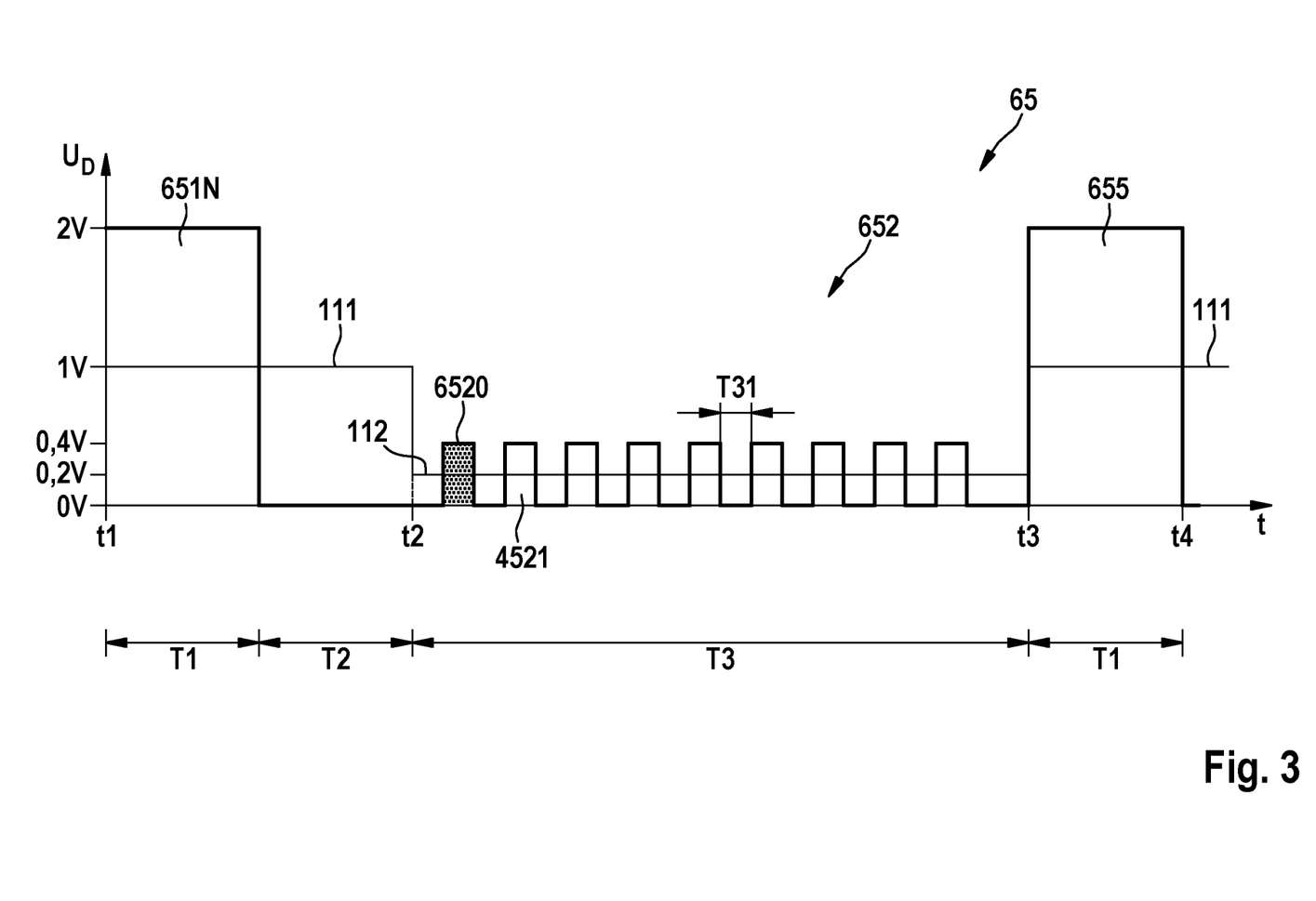
FIG. 3 shows a schematic curve of a difference voltage of CAN_H–CAN_L over time, for a transmission of useful data between subscriber stations, according to the first exemplary embodiment.

FIG. 3 shows, for a part of message 65, the difference voltage $U_D$–CAN_H–CAN_L over time t, formed during the transmission of a message 65 at bus 61 between the signals CAN_H and CAN_L between bus leads 611, 612. FIG. 3 shows the segment of message 65 situated between times t1 to t3. At time t1, first subscriber station 10 begins the transmission of the last bit 651N of arbitration phase 651. At time t2, the transmission of second subscriber station 20 begins, in order to transmit a specified number N of bits 6521 to 652N from the region for data 652. The specified number N of bits 6521 to 652N can be selected depending on the type of bus system 1. At time t3, first subscriber station 10 begins the transmission of the acknowledge bits 655, which is terminated at time t4.

According to FIG. 3, bits 651N of arbitration phase 651 and acknowledge bit 655 each have a time duration T1. Bit 651N, with a dominant data state, is followed by a bit with a recessive data state and a time duration T2. The time durations T1, T2 are equal in length. In contrast, bits 6521 through 652N of the region for data 652 each have a time duration T31. Time duration T1 is significantly longer than time duration T31. In the example of FIG. 3, time duration T1 is four times as long as time duration T31. An LV bit can for example last ½, ⅛, or 1/32 of time duration T1, which requires a standard arbitration bit for the transmission. Thus, the data rate for the transmission of data 652 is significantly higher than for the transmission in arbitration phases 651, 653.

As is shown in FIG. 3, between signals CAN_H and CAN_L there forms a difference voltage $U_D$ that has different sizes for the two different data states 1 or 0, or high or low, or dominant or recessive. In addition, the maximum level of difference voltage Up in the specific example of FIG. 3 during arbitration phases 651, 653 is approximately 2 V. In contrast, the maximum level of difference voltage Up during the second communication phase for the transmission of data 652 is approximately 0.4 V.

The signal for difference voltage Up in FIG. 3 at sub-bus 61 is achieved in that first subscriber station 10, as the winner of the arbitration in arbitration phase 651, lowers its signal sent to sub-bus 61, after a time t1+T1, to a recessive level. The lowering or switching over of the signal sent to sub-bus 61 can take place with the aid of changeover device 113. Alternatively, however, communication control device 15 can already specify a corresponding transmit signal TxD that is relayed to sub-bus 61 by transceiver device 11, if warranted with the aid of changeover device 113.

First subscriber station 10, or its transceiver device 11, maintains the recessive level until time duration T3 has elapsed. In other words, first subscriber station 10, or its transceiver device 11, maintains the recessive level until first subscriber station 10, or its transceiver device 11, wishes to send acknowledgment 655 in order to communicate the success or failure of the receipt of message 65 via sub-bus 61.

In addition, at time t2, with the aid of changeover device 113, subscriber station 10, or more precisely its transceiver device 11, changes its decision threshold for the reception of messages 65, 66 from bus 61. Here, at time t2 first subscriber station 10 changes over from a first decision threshold 111 to a second decision threshold 112. At time t3, first subscriber station 10 changes its decision threshold from second decision threshold 112 back to first decision threshold 111. Second subscriber station 20 carries out the same changes of its decision thresholds at times t2 and t3, using changeover device 23. Third subscriber station 30 carries out the same changes of its decision thresholds at times t2 and t3, using changeover device 33.

In the example of FIG. 3, first decision threshold 111 has a voltage value of 1 V. In contrast, second decision threshold 112 has a voltage value of 0.2 V in the example of FIG. 3. Thus, during time duration T3 first subscriber station 10 recognizes voltage levels that are above a value of 0.2 V as the dominant data state or bus state. All other voltage levels are recognized as the non-dominant data state or bus state.

In contrast, during the time duration t2–t1 first subscriber station 10 recognizes only voltage levels above a value of 1.0 V as dominant data state or bus state. Thus, voltage levels below the respective decision threshold 111, 112 are evaluated as recessive data state or bus state.

During time T3, second subscriber station 20 can send its data 652. For this purpose, second subscriber station 20 evaluates the identification numbers 651x, 653x of message 65 of first subscriber station 10. Depending on which identification number 651x, 653x the second subscriber station 20 receives in a message 65, second subscriber station 20 adds the respective desired data 652 to message 65. For this purpose, changeover device 16 changes over transceiver device 12 to transmit operation for time duration T3, even if in fact the first subscriber station 10 or the third subscriber station 30 has won the arbitration in arbitration phase 651, and therefore has the exclusive, collision-free access to bus 61 for the second communication phase of message 65 according to the CAN protocol or CAN FD protocol.

Thus, for example first subscriber station 10 sends, so to speak, a frame with a normal level and second subscriber station 20 inserts its data 652 into this frame.

Second subscriber station 20, or more precisely its transceiver device 21 and/or changeover device 23, reacts only to the at least one identification number 651x, 653x assigned to it. The same holds for third subscriber station 30. Transceiver device 21 of second subscriber station 20 sends data 652, which are in particular measurement data of a sensor, exclusively with a reduced level. The same holds for third subscriber station 30. In contrast, the arbitration is carried out with normal level and reduced baud rate by first subscriber station 10. In the example of FIG. 3, data 652 have a level that is reduced in comparison with the level of the bits of arbitration phases 651, 653 and of acknowledge bit 655.

The transition of the transmission between the first and second subscriber station 10, 20, or the first and third subscriber station 10, 30, takes place as follows. After the last sent recessive arbitration bit 651N, first subscriber station 10 sends a recessive level so that second subscriber station 20 can transmit its data 652. The last sent arbitration bit 651N of first subscriber station 10 requires some time to propagate via sub-bus 61 and to reach second subscriber station 20. Second subscriber station 20 also requires some time to register the last-sent arbitration bit 651N and to begin the sending of data 652. The first sent bit of data 652 also requires some time to propagate via sub-bus 61 to first subscriber station 10. These delays depend on the properties of second subscriber station 20 and on the length of sub-bus 61 between second subscriber station 20 and first subscriber station 10. The delays for subscriber station 20 may differ from the delay between subscriber stations 10, 30, or from sensor to sensor, and may be a function of the particular environmental conditions that obtain, such as temperature, humidity, etc.

Second subscriber station 20 prefixes a start bit 6520 to data 652, so that first subscriber station 10 will know when second subscriber station 20 sends first data bit 6521. After the complete transmission of the data 652, i.e. after the sending of the last data bit 652N, second subscriber station 20 sends a recessive level for a time duration T32.

For the transmission of data 652 including start bit 6520, a defined number of arbitration bit durations, or the defined time T3, is available to second subscriber station 20. As soon as this has elapsed, first subscriber station 10, and, possibly, one or more further subscribers in sub-bus 61, for example subscriber station 30, terminates the transmission or the reception by sending acknowledge bit 655 with a normal level and reduced baud rate, as stated above.

Between the termination of the measurement data transmission and the sending of acknowledge bit 655, adequate reserve time, in the form of time duration T32, is planned so that the last data bits of data 652 cannot be destroyed.

In this way, the bus load of sub-bus 61 or of sub-bus 62 can be reduced. Moreover, the data rate of the transmission, in particular between a control device and a sensor, can be increased. If first subscriber station 10 does not send any stuff bits, which are to be sent at regular intervals according to the previous CAN protocol with CAN FD, then the data rate can be increased by approximately a factor of five, with the same edge steepness and a reduction of the level from 2 V to 0.4 V.

With the described subscriber stations 10, 20, 30, 40, 50, a protocol for CAN or CAN FD, or a successor system to CAN FD, is realized in such a way that sensors, as slave subscriber station, can insert their measurement data into a frame sent for this purpose by the control device as master subscriber station. In addition, it is advantageous that a control device can retrieve the most up-to-date sensor data or measurement values from a sensor at all times, and spontaneously, and only as needed. As a result, the control device can always work with the currently required up-to-date measurement values, and the bus load at the sub-buses is not limited by unnecessarily sent sensor data.

Thus, the control device acts as master relative to the sensors. That is, in the present example, subscriber station 10 actively requests the measurement data of the sensors by sending the frame of CAN messages 65, 66, into which the sensors, or subscriber stations 20, 30, 40, 50, insert their data 652.

In the described configuration of bus system 1, the data exchange between the sensors via sub-buses, for example between subscriber station 20 and subscriber station 40, is not directly possible. As a rule, such a data exchange is also not necessary. However, if such a data exchange is to be possible, the sensor, for example subscriber station 20, can first transmit the desired data or information to the control device, i.e. to subscriber station 10, which then distributes the data or information to subscriber station 30 and/or subscriber station 40 and/or subscriber station 50.

For slave subscriber station 20, 30, 40, 50, which can be used in particular for a sensor, transceiver device 21, 31, 41, 51 can be developed and produced at lower cost, because slave subscriber station 20, 30, 40, 50 must be capable of transmitting exclusively with a reduced voltage level, and the demands of electromagnetic compatibility (EMC) can be reached more easily and at lower cost at low voltage levels.

A further advantage of the low voltage level is that slave subscriber station 20, 30, 40, 50 can be supplied with electrical energy at 3.3 volts instead of 5 V, because the maximum level of CAN high must not be allowed to be 3.5 volts.

In this way, the power loss of subscriber station 20, 30, 40, 50 can be reduced.

With the subscriber stations 10, 20, 30, 40, 50 described above, the data transmission rate can be increased by a multiple in comparison with conventional CAN or CAN FD.

A further advantage is that the LV communication carried out by subscriber stations 10, 20, 30, 40, 50, which takes place at a lower voltage than with the high voltage of 5 V or 3.3 V otherwise standard in digital systems, does not interfere with a standard CAN or standard CAN FD communication at the respective sub-bus 61, 62. During the data transmission, the LVCAN subscriber station produces smaller difference voltages than is usually the case. The difference voltages are so small that they cannot be perceived by standard CAN subscriber stations, because the difference voltages are below the decision threshold of 1 V, namely for example 0.5 V, or are even negative.

Subscriber stations 10, 20, 30, 40, 50 are advantageously configured in such a way that standard CAN subscribers are tolerant with respect to the message transmissions carried out by the described subscriber stations 10, 20, 30, 40, 50, and do not send any error messages 67. As a result, the described subscriber stations 10, 20, 30, 40, 50 can communicate without interference. However, the subscriber stations 10, 20, 30, 40, 50 described above can be configured in such a way that they can change over as needed to the standard protocol, and can then also exchange information with standard CAN subscriber stations.

The method carried out by the described subscriber stations 10, 20, 30, 40, 50 is thus fully compatible with previous CAN bus systems. Standard CAN or standard CAN FD subscriber stations can therefore also communicate in bus system 1, without interference from the other type of communication of the described subscriber stations 10, 20, 30, 40, 50.

In general, the introduction of sub-buses 61, 62 is suitable in particular if additional sensors are to be added to an existing bus system 1 without reworking the cable harness at the at least one previous subscriber station 10, or if the bus delay is to be prevented from causing reflections as a result of which of the baud rate would have to be reduced. If in this case an additional sub-bus 61, 62 is added, then the existing microcontroller of subscriber station 10 can also continue to be used, even if all CAN protocol controllers, such as communication control device 15, of the microcontroller are already in use. As a result, substantial development costs can in part be saved.

Figure 4:
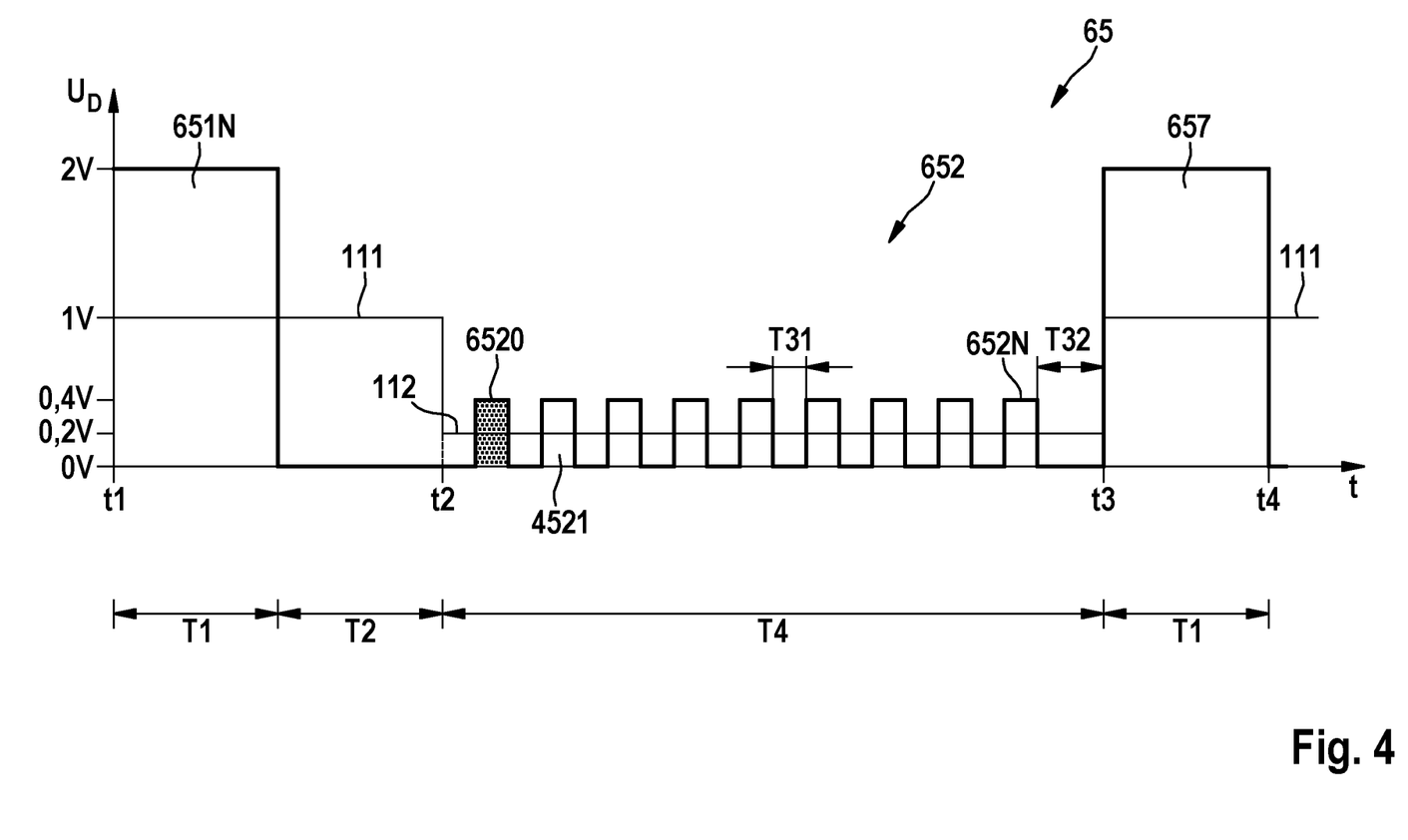
FIG. 4 shows a schematic curve of a difference voltage of CAN_H–CAN_L over time for a transmission of useful data between subscriber stations, according to a second exemplary embodiment.

FIG. 4 shows a transmission with a difference voltage Up according to a second exemplary embodiment. Here, first subscriber station 10 transmits at regular intervals, or after each elapsing of a time duration T4, a stuff bit 657 on sub-bus 61 and sub-bus 62, in order to enable a synchronization of subscriber stations 10, 20, 30 of bus system 1. As a result, the communication in bus system 1 is fully compatible with the previous CAN protocol with CAN FD or with a successor system to CAN FD. In the simplest case, this can take place in such a way that first subscriber station 10 sends a message 65 having the content "FFFFFFFFFFFFFFFF." Second subscriber station 20, or more precisely its transceiver device 21, always inserts its data 652 between the stuff bits 657 of first subscriber station 10. Given identical edge steepness and a reduction of the level from 2 V to 0.4 V, in this case the data rate can be increased by more than a factor of three.

Optionally, the communication on sub-bus 61 takes place as described in FIG. 3, and the communication on sub-bus 62 takes place as described in FIG. 4. Devices 11, 12 are correspondingly realized.

Figure 5:
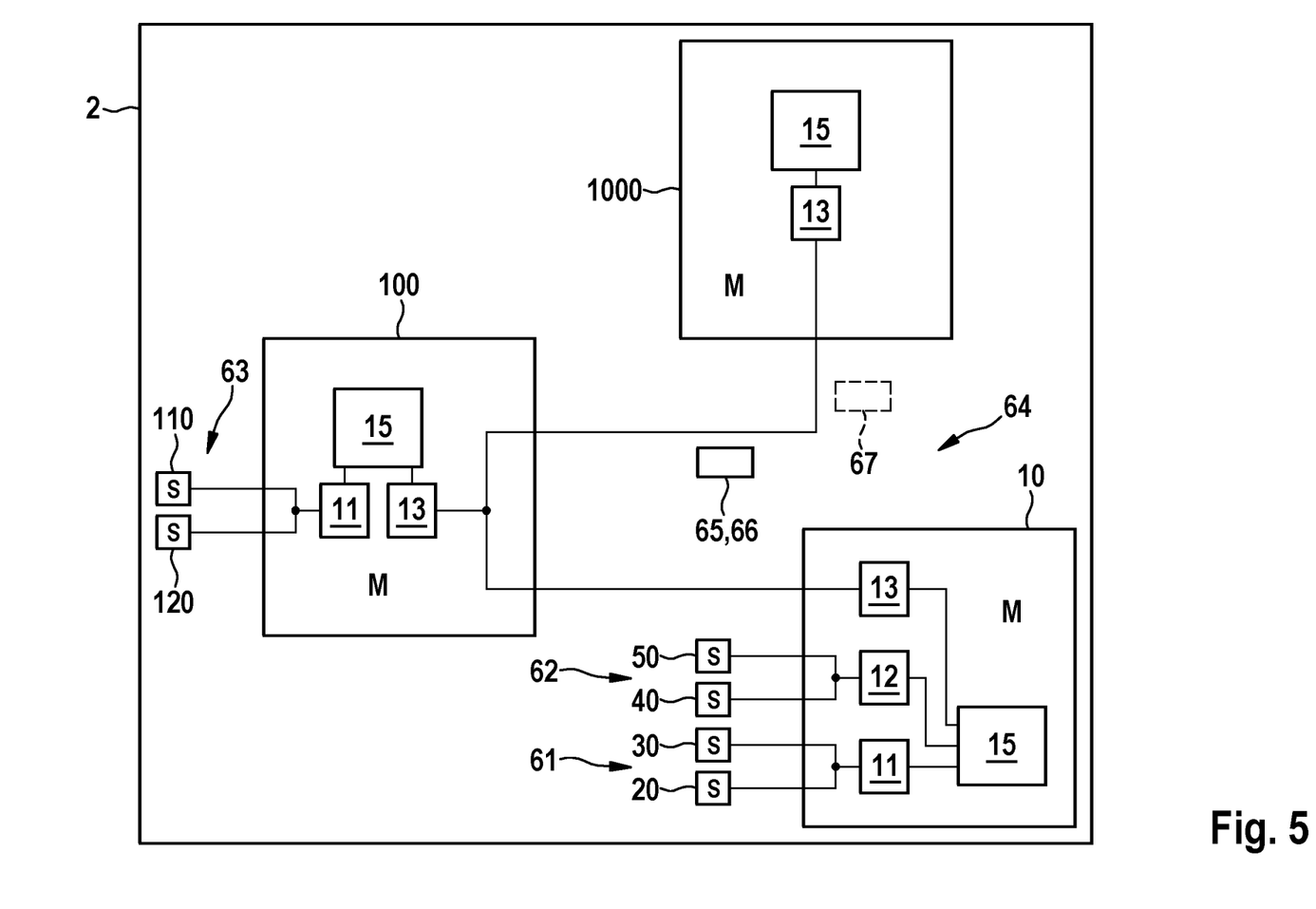
FIG. 5 shows a simplified schematic diagram of a bus system according to a third exemplary embodiment.

FIG. 5 shows another specific example for a bus system 2 according to a third exemplary embodiment, which can be for example a serial bus system, in particular a CAN bus system. Except for the differences described in the following, bus system 2 is realized in the same way as described above for bus system 1 according to one of the preceding exemplary embodiments.

Bus system 2 has three control devices, namely subscriber stations 10, 100, 1000. Subscriber stations 10, 100, 1000 each have a communication control device 15, in particular a protocol machine, connected respectively to a transceiver device 11, 12, 13 per connected sub-bus 61 through 64, in particular a transceiver. The control devices, i.e. subscriber stations 10, 100, 1000, each appear as master M, while the two sensors, or subscriber stations, 110, 120, connected to subscriber station 100, and the four sensors, or subscriber stations 20, 30, 40, 50, connected to subscriber station 10, appear as slave. The sensors of subscriber station 10 form the two sub-buses 61, 62. The sensors of subscriber station 100 together form a sub-bus 63. Subscriber stations 10, 100, 1000 form a sub-bus 64. Like sub-buses 61, 62, sub-buses 63, 64 each have two bus lines, although for simplicity this is not shown in FIG. 5.

In bus system 2, by arbitration via master sub-bus 64 it is decided which of the control devices, i.e. which of subscriber stations 10, 100, 1000, are permitted to send data 652 in a message 65 or to receive data 652 from its connected sensors, i.e. one of subscriber stations 20, 30, 40, 50, 110, 120. If an error occurs on sub-bus 64 during the communication, the subscriber station 10, 100, 1000 that notices the error sends an error message 67 on sub-bus 64 in order to inform the other subscriber stations 10, 100, 1000 about the error. Of course, in the case of an error an error message 67 can also be sent in sub-buses 61, 62, 63, in particular as provided in the CAN protocol specification with CAN FD.

According to a modification of the exemplary embodiments described above, in bus system 1, 2 at least one additional subscriber station can be connected to first subscriber station 10. The additional subscriber station can be any further subscriber of bus system 1, 2 that sends messages according to the conventional CAN protocol and/or CAN FD protocol.

Accordingly, the additional subscriber station is in particular either a control device or a sensor or an actuator. Therefore, the additional subscriber station is either superordinate or subordinate to first subscriber station 10 in terms of control. Alternatively, it is possible for the additional subscriber station to be a further device of the vehicle that is coordinate to first subscriber station 10, and/or that has no further relation to first subscriber station 10 in terms of control.

If additional control devices or masters are to be connected to bus system 2 as subscriber station 10 or some other subscriber station, then it is advantageous to connect these to a single sub-bus 61, 62, 63, 64, because an arbitration of messages 65, 66 is possible without destruction only within a single sub-bus.

In general, in bus systems 1, 2 it is possible to connect more than three subscribers to at least one of the sub-buses 61, 62, 63, 64. However, the reduction of the reflections can then become a problem. As a rule, however, the control devices are equipped with more than one communication control device 15 or some other protocol controller, so that the other control devices can also comfortably be connected to additional CAN buses, and can communicate via these additional channel(s).

According to a fourth exemplary embodiment, only the control device acting as master, i.e. in the example of FIG. 5 subscriber stations 10, 100, 1000, can check the received signals or messages 65, 66 for protocol errors, because the content of data 652 is not transmitted beyond sub-buses 61, 62, 63, 64. In addition, measures are taken that prevent the subscriber station(s) not taking part in the communication from recognizing protocol errors that are communicated with an error message 67. These measures ensure that a subscriber station for which the current message 65, 66 is not intended, and which therefore is not involved in the current communication, does not infringe the standard protocols, e.g. CAN FD ISO 11898-1, in such a way that the subscriber station interferes with a communication in which it is not involved. If additional master control devices are connected to one of the sub-buses, for example as in sub-bus 64 of FIG. 5, then these master control devices can check only a targeted selection of messages 65, 66 for protocol errors. For example, an error handling device can be configured to carry out an error handling of a received message 65, 66 only if the test yields the result that the received message is intended for subscriber station 10, 100, 1000. This prevents signals that can be correctly received by particular receivers, in particular subscriber station 10, from being destroyed by subscriber stations that are not involved in the data transmission. In a specific case, for example subscriber station 100 may not be involved in the transmission of data between subscriber stations 10, 1000.

Optionally, in the exemplary embodiments described above, the protocol for the transmission of messages 65, 66 in bus systems 1, 2 can be realized so that "empty" messages 65, 66, i.e. messages in which neither data 652 nor a checksum is transmitted, do not cause an error message 67.

According to a fifth exemplary embodiment, at least two subscriber stations 10, and thus a plurality of control devices, are connected to the same sub-bus 61, 62. Here, both control devices, or subscriber stations 10, can simultaneously request measurement data, or data 652, from the sensor and also simultaneously evaluate it. If one of the control devices, or one of the subscriber stations 10, fails, or does not timely retrieve the measurement data or data 652 of the sensor, for example of second subscriber station 20, then the data 652 are nonetheless requested in good time by the other control device. In this way, redundancy is brought about with a low outlay.

According to a sixth exemplary embodiment, during transmission first subscriber station 10 and/or subscriber station 100 operates with two different difference voltage levels. In this case, in particular transceiver device 11 sends for example stuff bits 657, or other data 652 that are not added by second subscriber station 20, with the lower level, as shown in FIG. 3 or FIG. 4. Here as well, after the changeover from the normal level to the reduced level, a start bit 6520 can be inserted. In this way, the methods or protocols used for the transmission in bus system 1 become compatible with one another. As a result, the interpretation of the level by the receiver is simplified, and additional costs can be saved.

According to a seventh exemplary embodiment, at least one of the transceiver devices 21, 31, 41, 51 has a receiver for the serial reception of a message 65, 66 from a sub-bus 61, 62, 63 of bus system 1, 2 and for producing a serial digital receive signal RX from message 65, 66 received from sub-bus 61, 62, 63. In addition, this at least one transceiver device 21, 31, 41, 51 has an evaluation block for evaluating whether the received message 65, 66 is intended for subscriber station 20, 30, 40, 50. In addition, at a terminal a signal can be outputted serially on the basis of the evaluation of the evaluation block. Here, the evaluation block is configured to always output, at the terminal, a signal edge when the received message 65, 66 is intended for the subscriber station 20, 30, 40, 50 and a data bit of data 652 is currently present in receive signal 65, 66. In contrast, the evaluation block is configured to not output a signal edge at the terminal when the received message 65, 66 is intended for subscriber station 20, 30, 40, 50 and a stuff bit 457 is currently present in receive signal 65, 66.

The evaluation block can carry out the evaluation as to whether the received message 65, 66 is intended for subscriber station 20, 30, 40, 50 or not on the basis of identifier 451$x$, as described above with reference to FIG. 2 and FIG. 3.

The signal edges at the terminal are processed by a deserializer in order to convert the data bits of data 652 into a parallel signal. Using the parallel signal, end stages can be controlled. In particular, an actuator can be controlled.

Alternatively, at least one of the changeover devices 23, 33, 43, 53 of FIG. 1 is a serializer that hands over sensor values, based on the signal from the terminal, as data 652 to the at least one of the transceiver devices 21, 31, 41, 51. Here, the at least two sensor values can be analog or digital sensor values. For analog sensor values, in addition an analog/digital converter can thus be connected to the at least one of the transceiver devices 21, 31, 41, 51. Thus, here as well subscriber station 10 and/or the at least one of the transceiver devices 21, 31, 41, 51, or its subscriber station 20, 30, 40, 50, actively requests the measurement data of the sensors.

All embodiments described above of bus systems 1, 2 of subscriber stations 10, 20, 30, 40, 50, 100, 110, 120, 1000, and of the method, can be used individually or in any possible combination. In particular, all features of the exemplary embodiments described above, and/or their modifications, can be combined in any way, or omitted. In addition, in particular the following modifications are conceivable.

Any number and configuration of the subscriber stations 10, 20, 30, 40, 50, 100, 110, 120, 1000 in bus systems 1, 2 can be chosen.

The bus systems 1, 2 described above are described on the basis of a bus system based on the CAN protocol or CAN FD protocol. However, bus systems 1, 2 according to the various exemplary embodiments can alternatively be a different kind of communication network. It is advantageous, but is not a necessary condition, that an exclusive, collision-free access of a subscriber station 10, 20, 30 to bus 61 is ensured in the bus systems 1, 2, at least for particular time spans. The same holds for subscriber stations 10, 40, 50 of sub-bus 62. The same holds for subscriber stations 100, 110, 120 of sub-bus 63. The same holds for subscriber stations 10, 100, 1000 of sub-bus 64.

Alternatively to the preceding exemplary embodiments, the LV transmitter can recognize, at an earlier time, the suppression of the subdominant LV bit by a dominant standard bit through the exceeding of a difference voltage threshold between 0.1 V or 0.25 V and 1 V.

Alternatively to the preceding exemplary embodiments, the limit of 0.2 V or 0.5 V can be raised to 2 V, if, due to preceding collisions/errors, the transmission of a message with a standard level can be expected.

Bus systems 1, 2 according to the exemplary embodiments are in particular a CAN network or a CAN FD network or a FlexRay network or an SPI network.

However, it is conceivable that one of the two bus leads 611, 612 is connected to ground, and is thus a ground lead, and the other of the two bus leads 611, 612 is a signal lead on which the bus signal for messages 65, 66 is transmitted. The same holds for bus leads 621, 622 of sub-bus 62. The same holds for bus leads of sub-bus 63. The same holds for bus leads of sub-bus 64.

What is claimed is:

1. A master subscriber station for a bus system, comprising:
   a first transceiver device for at least one of: sending a message to at least one slave subscriber station via a first sub-bus of the bus system, or receiving a message from the at least one slave subscriber station via the first sub-bus of the bus system; the at least one slave subscriber station being subordinate in terms of control to the master subscriber station;
   a second transceiver device for at least one of: sending a message to at least one other subscriber station via a second sub-bus of the bus system, or receiving a message from the least one other subscriber station via the second sub-bus of the bus system;
   a communication control device for creating messages to be sent via one of the first or second sub-buses of the bus system or for evaluating messages received from one of the first or second sub-buses of the bus system; and
   a linking device for linking a terminal of the first transceiver device to a terminal of the communication control device, for outputting a signal that was generated from the message received from the first sub-bus, and for linking a terminal of the second transceiver device to the terminal of the communication control device, for outputting a signal that was generated from the message received from the second sub-bus, so that only one signal is forwarded as a receive signal from the first and second transceiver devices to the terminal of the communication control device.

2. The master subscriber station of claim 1, wherein the linking device is configured and connected to the communication control device so that when both the signal at the terminal of the first transceiver device is present and also the signal at the terminal of the second transceiver device is present, at the terminal of the communication control device a receive signal is forwarded having signal states that result from a superposition of the signal states of the signal at the terminal of the first transceiver device with the signal states of the signal at the terminal of the second transceiver device.

3. The master subscriber station of claim 1, wherein the first transceiver device is configured to actively retrieve data from at least one slave subscriber station of the first sub-bus.

4. The master subscriber station of claim 1, wherein the communication control device is configured to select an identification number in the message sent by the master subscriber station as a function of which data are to be retrieved from which subscriber station of the sub-bus.

5. The master subscriber station of claim 1, wherein the communication control device and the first and second transceiver device is connected so that a message to be sent that was created by the communication control device is inputted into the first and second transceiver device to send the message on the first and second sub-bus.

6. The master subscriber station of claim 1, wherein the at least one other subscriber station of the second sub-bus is subordinate in terms of control, or superordinate in terms of control, or coordinate in terms of control, to the master subscriber station, wherein the master subscriber station includes a control device, and the at least one slave subscriber station of the first sub-bus includes a sensor or an actuator, and wherein the at least one other subscriber station of the second sub-bus includes a control device or a sensor or an actuator.

7. The master subscriber station of claim 1, wherein:
   the first transceiver device is configured to send a bus signal having a voltage level that can be overwritten by the slave subscriber station when the master subscriber station has an exclusive, collision-free access to the first sub-bus,
   the first transceiver device is configured to lower its decision threshold for receiving data to a second decision threshold when the master subscriber station has the exclusive, collision-free access to the first sub-bus, so that the first transceiver device can receive data that the slave subscriber station produces with a lower maximum voltage level than the maximum voltage level with which the master subscriber station sends the message, and
   the first transceiver device is configured to raise its decision threshold for receiving data to a decision threshold and to send an acknowledge bit to the sub-bus that has the greater maximum voltage level, after the elapsing of a prespecified time duration during which the master subscriber station has the exclusive, collision-free access to the first sub-bus.

8. A bus system, comprising:
   at least two sub-buses including a first sub-bus and a second sub-bus;
   at least one master subscriber station for the bus system, including:
      a first transceiver device for at least one of: sending a message to at least one slave subscriber station via the first sub-bus of the bus system, or receiving a message from the at least one slave subscriber station via the first sub-bus of the bus system; the at least one slave subscriber station being subordinate in terms of control to the master subscriber station;
      a second transceiver device for at least one of: sending a message to at least one other subscriber station via the second sub-bus of the bus system, or receiving a message from the least one other subscriber station via the second sub-bus of the bus system;
      a communication control device for creating messages to be sent via one of the first or second sub-buses of the bus system or for evaluating messages received from one of the first or second sub-buses of the bus system; and
      a linking device for linking a terminal of the first transceiver device to a terminal of the communication control device, for outputting a signal that was generated from the message received from the first sub-bus, and for linking a terminal of the second transceiver device to the terminal of the communication control device, for outputting a signal that was generated from the message received from the second sub-bus, so that only one signal is forwarded as a receive signal from the first and second transceiver devices to the terminal of the communication control device; and
   the at least one slave subscriber station that is subordinate in terms of control to the master subscriber station; and
   the at least one other subscriber station;
   wherein the at least one master subscriber station and the at least one slave subscriber station are connected to one another via at least the first sub-bus so that the at least one master subscriber station can communicate with the at least one slave subscriber station.

9. The bus system of claim 8, wherein subscriber stations of the bus system are configured to communicate via at least one sub-bus using a communication protocol in which, in a first communication phase, it is negotiated which of the subscriber stations has, in a second communication phase, a collision-free access to the sub-bus, and wherein the at least one slave subscriber station is configured to send data via the sub-bus to the at least one master subscriber station in a second communication phase in which the at least one master subscriber station has the collision-free access to the sub-bus and sends a voltage level to the sub-bus that is overwritable for the at least one slave subscriber station.

10. The bus system of claim 8, wherein the at least one slave subscriber station includes a transceiver device for sending data for a message to, and/or receiving a message from, a master subscriber station that is superordinate in terms of control to the slave subscriber station, via a first sub-bus of the bus system, and wherein the transceiver device is configured to insert the data into a message sent by the master subscriber station of the bus system when the master subscriber station actively requests the slave subscriber station to insert the data.

11. The bus system of claim 10, wherein the transceiver device of the slave subscriber station is configured to produce the data with a lower maximum voltage level than the maximum voltage level with which the master subscriber station sends the message, and to prefix at least one start bit to the data, and, following the data, to send a bus signal with the lower of the two voltage levels sent by the transceiver device.

12. The bus system of claim 10, wherein the transceiver device of the slave subscriber station is configured to send the data on the sub-bus with a higher data rate than the data rate of the message sent by the master subscriber station of the bus system.

13. The bus system of claim 10, wherein the transceiver device of the slave subscriber station is configured to evaluate an identification number in the message sent by the master subscriber station, and to select the data that are to be inserted into the message sent by the master subscriber station of the bus system on the basis of the result of the evaluation of the identification number.

14. The bus system of claim 10, wherein the transceiver device of the slave subscriber station is configured to insert the data between stuff bits that are sent by the master subscriber station at regular intervals when the master subscriber station has an exclusive, collision-free access to the sub-bus.

15. A method for transmitting data in a bus system, the method comprising:
   using at least one first transceiver device to send a message to and to receive a message from at least one slave subscriber station that is subordinate in terms of control to a at least one master subscriber station, via a first sub-bus, wherein the bus system is configured so that the at least one master subscriber station is connected to at least two sub-buses to each of which at least one subscriber station is connected, the at least one master subscriber station having a communication control device for creating the message to be sent or for evaluating a message received from one of the sub-buses, and the at least one master subscriber station in addition having the at least one first transceiver device for the first sub-bus and a second transceiver device for a second sub-bus;
   using the second transceiver device to send a message to and to receive a message from at least one other subscriber station, via the second sub-bus; and
   using a linking device connected to the communication control device to link a terminal of the first transceiver device, at which a signal is outputted that was generated from the message received from the first sub-bus, and a terminal of the second transceiver device at which a signal is outputted that was generated from the message received from the second sub-bus, so that only one signal is forwarded, as received signal, to a terminal of the communication control device.

* * * * *

UNITED STATES PATENT AND TRADEMARK OFFICE
CERTIFICATE OF CORRECTION

Page 1 of 1

PATENT NO. : 11,115,236 B2
APPLICATION NO. : 16/742995
DATED : September 7, 2021
INVENTOR(S) : Simon Weissenmayer It is certified that error appears in the above-identified patent and that said Letters Patent is hereby corrected as shown below:

On the Title Page

In Item (22) Filing Date, replace:
"Mar. 20, 2020"

With:
--Jan. 15, 2020--

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*